May 4, 1926.
W. L. SHAFER
HEAT REGULATING SYSTEM
Filed Feb. 23, 1924
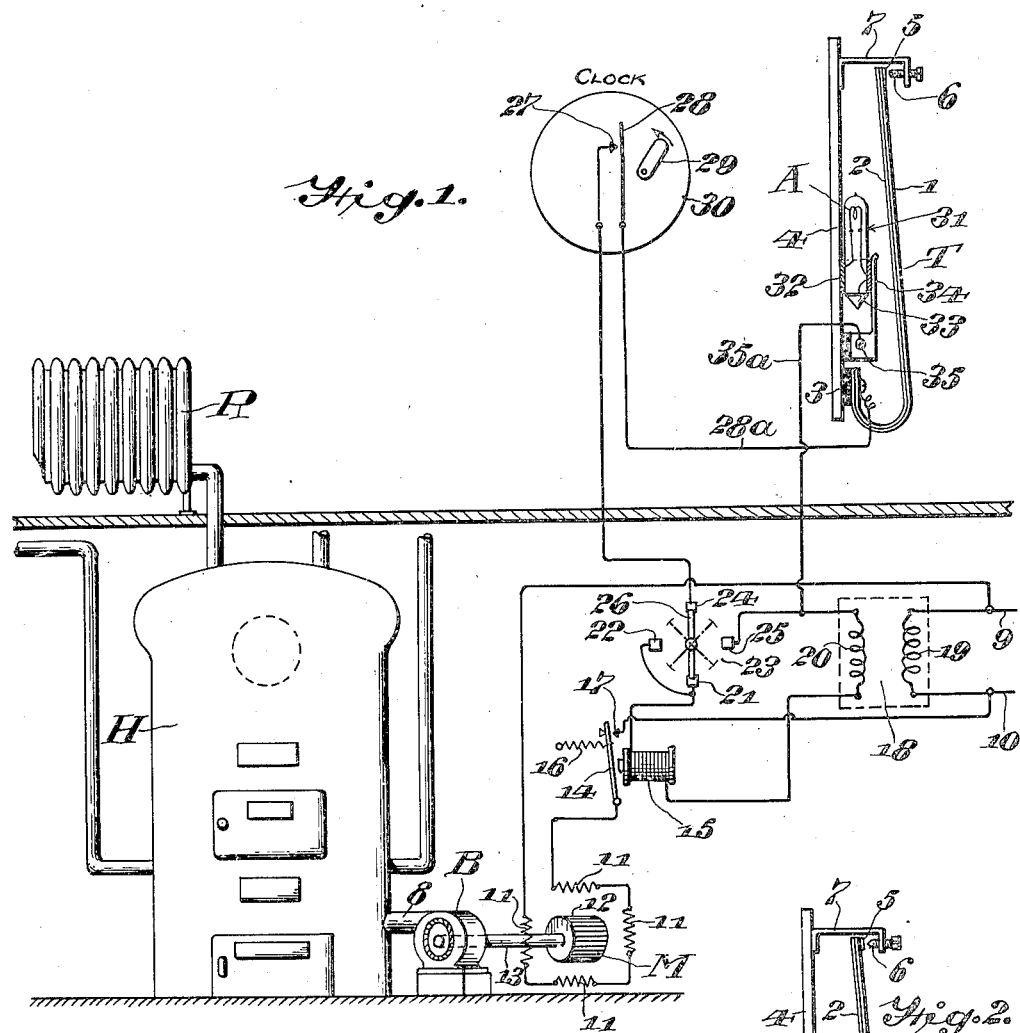

Patented May 4, 1926.

1,583,496

UNITED STATES PATENT OFFICE.

WILLIAM L. SHAFER, OF UPPER DARBY, PENNSYLVANIA.

HEAT-REGULATING SYSTEM.

Application filed February 23, 1924. Serial No. 694,664.

*To all whom it may concern:*

Be it known that I, WILLIAM L. SHAFER, a citizen of the United States, residing in Upper Darby, Delaware County, State of Pennsylvania, have invented certain new and useful Improvements in Heat-Regulating Systems, of which the following is a specification.

My invention relates to apparatus and systems involving heat- or temperature-responsive means for effecting any suitable control, as of a signal or indicator, or any other apparatus or device, but more particularly for effecting control of a heating system, furnace or the like.

In accordance with my invention, there is associated with a heat- or temperature-responsive device, as a thermostat or any equivalent device, means for subjecting it to a second or additional source of heat or to a control dependent upon or responsive to a second or additional source of heat, for any suitable purpose, but more particularly for effecting control of means producing or controlling the production of the primary or principal source of heat.

More particularly in accordance with my invention, the heat- or temperature-responsive means or device, affected by a principal or primary source of heat, controls a secondary or auxiliary source of heat which affects or controls, or assists in affecting or controlling the heat- or temperature-responsive means or device; and more particularly in this arrangement the heat- or temperature-responsive means or device controls the principal or primary source of heat, and the secondary or auxiliary source of heat affects or determines the character, rate or time of control of the principal or primary source of heat.

Further in accordance with my invention, a heating system broadly, and more particularly a heating system for a dwelling, building or the like, is controlled by a thermostat or equivalent which responds to the temperature dependent upon the heat produced or delivered by the heating system to control that system, and in addition controls a secondary or auxiliary source of heat which affects or controls the thermostat or equivalent to control with greater nicety and with smaller fluctuations the temperature to be maintained by the heating system.

My invention resides in the method, system, apparatus and features of structure and combination of the character hereinafter described and claimed.

For an understanding of my method, and for an illustration of some of the many forms my apparatus may take, reference is to be had to the accompanying drawing, in which:

Fig. 1 is an illustration, partly diagrammatic, of a system embodying my invention.

Fig. 2 is a view of a thermostat having applied thereto a modified form of auxiliary or secondary source of heat.

Fig. 3 is a fragmentary diagrammatic view illustrating indirect control of the thermostat by the secondary or auxiliary source of heat.

Referring to Fig. 1, H is a boiler or heater, located in the cellar of a dwelling, and delivering hot air, hot water, steam, vapor or other suitable heating medium to heat-radiating or equivalent structure, generically indicated at R, and located at suitable point or points on the first and other floors of a dwelling or building.

The rate of combustion of fuel in the heater or boiler H, or, in general, the amount of heat or rate of delivery of heat by the boiler or heater H to the heat-delivering means, as R, in the dwelling, is controlled by any suitable temperature-responsive means, located at any suitable or desired point within the dwelling and responsive to the temperature or heat thereat as caused or effected by the heating medium delivered by the boiler or heater H. With the temperature- or heat-responsive device is associated a secondary source of heat, preferably and generally of small capacity, for directly or indirectly controlling the heat- or temperature-responsive device in addition to the main or primary source of heat, as R, to cause the temperature-responsive device to initiate or effect a control of the rate of combustion in the heater or boiler H or of the amount or temperature of the heating medium delivered thereby, at a time other than that at which the control would be effected or initiated were the secondary or auxiliary source of heat not present; preferably and generally such control is initiated or effected, as by lowering the rate of combustion or rate of heat delivery in or from the heater or boiler H at a time in advance of the time at which the rate of combustion or heat delivery would otherwise be lowered or reduced under control of the temperature-responsive device were the auxiliary or secondary source of heat omitted.

In the example illustrated, the temperature-responsive device is a thermostat or equivalent T, comprising, for example, the sheet of brass 1, or equivalent, secured to the sheet of steel 2, or equivalent, and secured at one end to the post or abutment 3, in this instance of insulating material, which may be secured upon the support or base 4, in this instance of conducting material. This combination forms one of the well known types of the thermostats whose characteristic is that changes in temperature of the ambient air or other medium causes deflection of its free end, at which is carried a contact 5 adapted to co-act with the associated adjustable contact or screw 6 carried by the conducting bracket 7 and secured to the base 4, whereby contact between members 5 and 6 is made or broken in response to changes in temperature as caused or induced by the primary or principal source of heat, as R.

In the boiler or heater H may be used coal, or other solid fuel, or there may be used liquid fuel, as oil, or gas, and the rate of combustion controlled by the thermostat T.

In the example illustrated, it is assumed there is used in the heater H coal or other solid fuel, and for controlling its rate of combustion there is utilized a blower, fan, pump or other equivalent means B delivering air through the duct 8 into the ash pit or below the grate of the heater H, all air passages into the ash pit being fully closed or more or less suitably restricted, the air passing upwardly through the grate and fuel bed thereon to supply the oxygen which supports combustion, and the rate of combustion will depend upon the rate of delivery of air by the blower B, which is preferably of the turbine, fan or blower type driven by any suitable means, as, for example, the electric motor M. In the example illustrated, the electric current is delivered by the supply conductors 9 and 10, connecting, for example, with a 110 volt alternating current network or generator, though it will be understood that direct current apparatus may be used in lieu of the alternating current apparatus utilized in the illustrated example of my invention. The motor M may be of any suitable type, for example, an induction motor whose stator windings are indicated at 11 and whose rotor is indicated at 12 and connected to the rotary element of the blower B by the shaft 13.

The apparatus or means for rendering the motor M self-starting is well known in the art, and is not illustrated. Generally, a motor of much less than one horse power is utilized, and for small dwellings a motor of about one-thirtieth horse power suffices. One terminal of the stator windings 11 is connected to the supply conductor 9, and the other terminal to the armature 14 of a relay 15 which, when utilized on an alternating current circuit, as illustrated, will be provided with a shading coil or equivalent means, as commonly understood in alternating current practice. The armature 14 is normally held retracted by gravity, or, as indicated, by the spring 16, but when the winding of the relay 15 is energized the armature 14 is attracted and engages the contact 17, connected with the supply conductor 10, whereupon the motor circuit is closed, the motor is energized and drives the blower B. Where the supply current is of the alternating current type, there is preferably utilized a transformer 18 whose primary 19 is connected to the supply conductors 9 and 10 and whose secondary 20 delivers current at suitably low potential, as, for example, 12 volts. One terminal of the secondary 20 connects with one terminal of the relay winding 15, whose other terminal connects with the contacts 21 and 22 of the manually operated switch 23 comprising, in addition to the contacts 21 and 22, the contacts 24 and 25, and the rotatable bridging member 26 adapted to engage and connect diametrically opposed contacts. In the position indicated, the contacts 21 and 24 are connected by the member 26, and accordingly, said other terminal of the winding of relay 15 connects through the switch 23 with the contact 27, with which the yielding contact 28 is brought into engagement for suitable periods by the member or cam 29 operated by the clock 30, the member 29 being released and actuated by the clock mechanism at such time as may be determined by the setting of the clock mechanism, as, for example, the usual alarm mechanism thereof, the member 29 when so actuated forcing the contact 28 into engagement with contact 27 and holding them in engagement for a predetermined length of time, as, for example, many hours, as may be determined by the clock setting. When the contacts 27 and 28 are in engagement with each other, connection is made through the conductor 28ª with the thermostat strips 1 and 2, and through them with the contact 5, and when the latter is in engagement with the screw or contact 6 connection is made to the conducting base 4 and thence through the filament A of a small incandescent electric lamp 31, the filament A constituting the auxiliary or secondary source of heat of the control system. The lamp 31 is provided with a contact 32 in engagement with the base 4 and connected to one terminal of the filament A, whose other terminal connects with the lamp contact 33 which engages the contact spring 34 secured to the abutment 35 carried by but insulated from the base 4. The abutment 35 is connected through conductor 35ª with the remaining terminal of the transformer secondary 20. When the circuit through contacts 27, 28 and through contacts 5 and 6 is closed, filament A will be heated and the relay 15 will be energized, attracting its armature 14 into engagement with contact 17, thereby energizing the motor M which drives the blower B, which supplies air to the heater H.

The operation of the system is as follows: Assuming it to be desired that the temperature adjacent the thermostat T should be maintained at 70 degrees F., the contact screw 6 is adjusted to suitable position. Assuming further that for any reason the temperature adjacent the thermostat T has fallen below the desired temperature, the upper end of the thermostat will move toward the right, bringing contact 5 into engagement with screw 6, and with the contacts 27 and 28 in engagement with each other and the switch member 26 in the position illustrated, the relay 15 will be energized, causing energization of the motor M, which will start and continue to drive the blower B, with resultant increase in rate of combustion in the heater H, which will cause delivery of heat at increased rate to the heat-delivering means or radiator R, and the temperature of the air within the dwelling adjacent the thermostat T will rise. But closure of circuit at the contacts 5 and 6 has also caused current from the transformer secondary 20 to flow through the filament A, thus setting up a secondary or auxiliary source of heat, which, though small, but because placed close to or adjacent the thermostat T, raises the temperature of the latter, causing it to be subjected to a temperature which is really in excess of the actual temperature of the surrounding air as influenced or caused by the radiator R. Accordingly, under the influence of the temperatures due to the radiator R and the auxiliary source of heat A, the upper end of the thermostat T will deflect toward the left, as it does with rising temperature, and breaks circuit at contacts 5 and 6 before the room or air temperature has attained a temperature of 70 degrees. In other words, the thermostat control circuit is open, and the motor M deenergized and the blower B stopped before the room temperature attains the desired magnitude. But the rate of combustion in the heater H does not instantly fall, but decreases gradually, and accordingly, for some time after rupture of circuit at contacts 5 and 6 the delivery of heat by radiator R to the air adjacent the thermostat T continues, with continuing rise in temperature of the surrounding air, and may exceed the desired magnitude of 70 degrees. But after a time the rate of combustion in the heater H will have been so reduced that the temperature of the air will no longer rise, but will again fall, and may fall somewhat below the desired 70 degrees, in which case the circuit is again closed at contacts 5 and 6 and the blower again operated. But it will be operated for a shorter period of time when again the contacts 5 and 6 will separate. And so on, the blower B will be operated for shorter and shorter periods and the temperature of the air adjacent the thermostat T will become more closely the desired 70 degrees, and when the system has come into steady and full operation, the blower B will be operated only for short times, separated by periods of idleness.

The foregoing is the description of operation after the control system has been out of operation for a considerable time, as, for example, when the clock has been so set that the contacts 27 and 28 are opened, say, at 11 p. m. and are not brought into engagement again until, say, 5 a. m.

Whenever coal is delivered into the fire box of the heater H there will be a temporary reduction in the rate of heat delivery by the radiator R, but the automatic control system described will promptly bring the temperature back to the desired magnitude.

It is accordingly characteristic of my invention that by recourse to the auxiliary source of heat A the thermostat T is subjected to or reaches the critical circuit-opening temperature sooner than it otherwise would, with the result that fluctuations of temperature of the air in the dwelling above and below the desired magnitude is greatly reduced. In other words, by recourse to the auxiliary source of heat A the "hunting" or passage of temperature materially beyond and materially below the desired temperature is greatly reduced, and by my system, as determined in practice, the fluctuations of temperature from the desired temperature are small indeed, and in fact small fractions of a degree, notwithstanding great changes of weather conditions and outdoor temperature.

The utilization of the secondary source of heat A, in a broad aspect, effects a control upon the thermostat T in addition to the control thereof by the temperature of the surrounding air, and the auxiliary control is of such character as to cause a change in rate of combustion in the heater H at a time earlier than otherwise would occur, as when the auxiliary control is omitted. In other words, the effect of the auxiliary control is to anticipate the arrival of the temperature of the air at the desired magnitude, and so introduce a corrective for the tendency of the mass of burning fuel to continue to deliver heat at such rate as to cause the surrounding air to pass for a time beyond the desired temperature in either direction.

Should the blower B be in operation, or should it come into operation while the ash pit door is open for removal of ashes, the air delivered by the blower B into the ash pit would drive ash dust out of the door. To prevent this, the switch member 26 may be placed in any of the positions intermediate the switch contacts, as indicated in dotted lines, thereby preventing operation of the motor M. After closure of the ash pit door the switch member 26 may be restored to the position indicated, when the automatic control by the thermostat apparatus is resumed. Or if it is desired for any reason to eliminate the automatic control, the switch member 26 may be thrown into position where it will bridge the contacts 22 and 25, whereupon the blower B will be operated so long as the switch member 26 is in that position, for in that position the relay 15 will be continuously energized.

While I have described the clock control switch 27, 28 in the automatic control or thermostat circuit, it will be understood that the clock control may be omitted, and the switch contact 21, or switch contact 24 if the switch is to be utilized, connected directly to the conductor 28ª.

It shall be understood that the foregoing description is illustrative, and not limitive of my invention, for it is obvious that the auxiliary source of heat A may be positioned upon the opposite side of the thermostat T, and that the contact 6 may be disposed upon the opposite side of the thermostat T from which indicated, all depending upon the nature of the control desired, and whether or not the control be applied to a heating system of the character described or to any other system.

While other forms of auxiliary source of heat may be employed, an incandescent lamp is suitable or desirable in many cases, as in the case of control of the heating system of a dwelling, for the filament A, in addition to evolving heat, is incandescent, and therefore visible, and when an observer notes that the filamet A is incandescent it serves as an indication that the contacts 5 and 6 are closed, and accordingly that the rate of combustion in the heater A has been increased and that the temperature of the room is rising or will rise.

It will readily be understood also that while my invention is applicable to a system of the character described in which air is blown or forced into the furnace or heater, the thermostat may be used to vary or adjust natural draft, as well understood in the art.

It will further be understood that the auxiliary heating resistance A may be connected in a circuit in parallel with the winding of the relay R, instead of in series as indicated in Fig. 1.

It shall be further understood that the auxiliary source of heat, as A, need not be electrical in character, but may be any other suitable source of heat, as a gas flame or the like, which may be turned on and off or high or low by the action of the temperature-responsive device T, which latter need not control contacts, but may effect any other suitable mechanical control in the system of which it forms a part, whether that system be a heating system, an indicating or signal system, or any other system.

While an electrical heating resistance in the form of an incandescent lamp filament is in some instances preferable, as above stated, it shall be understood that the heating resistance A', as indicated in Fig. 2, may be of any other suitable type, as a resistance wire or conductor which is heated by the current passing therethrough to a temperature, which need not be that of incandescence, suitable to affect the thermostat T or equivalent. Such an arrangement is shown in Fig. 2, where the resistance conductor A, serving as the auxiliary source of heat, may be an ordinary metallic resistance conductor of any suitable material, as nickel, nichrome, manganin, etc.

In lieu of effecting the bias or auxiliary control of the principal controller, which may as herein described be a thermostat T or other suitable or equivalent means, by an auxiliary source of heat, it may be effected by any suitable force operating upon the controller, as T, in such direction as to procure the nature of control desired, and such force is preferably brought into action under the control of the controller, as T.

An example of this last named arrangement is indicated in Fig. 3, where there is exerted upon the controller or thermostat T a force tending toward earlier separation of contacts 5 and 6 than would otherwise occur. The force in this instance is magnetic in character, produced by the magnet 36, which, as indicated, is preferably an electro-magnet which is energized when the contacts 5 and 6 are in engagement with each other. The energization, however, is controlled indirectly by the contacts 5 and 6 through or by the thermal relay 37 comprising a second or auxiliary thermostat $t$ comprising, for example, a sheet of brass 1 and a sheet of steel 2 and deflecting, upon rise in temperature, to engage the contact 38 connected with one terminal of the winding of the electro-magnet 36, whose other terminal connects with the source of current C, whose other terminal connects with the thermostat $t$. The heat affecting the thermostat $t$ is produced by the auxiliary or secondary source of heat A², which is a resistance wire surrounding or disposed near the thermostat $t$ and energized, as in Fig. 1, when contacts 5 and 6 are in engagement with each other.

By this arrangement the auxiliary or secondary source of heat does not directly affect the main controller or thermostat T, but causes closure of the circuit of the electro-magnet 36 which applies a force to the main controller T, the magnitude of the force exerted by the magnet upon the controller T being determined by the distance of the magnet pole from the thermostat T, and by suitably adjusting the magnitude of the current traversing the winding of the electro-magnet.

What I claim is:

1. In a heating system, a primary source of heat comprising means for producing combustion, means for transferring the heat to a desired region, means controlling the combustion, an electric circuit controlling said combustion-controlling means, a thermostat in said region responsive to the transferred heat controlling said circuit, and a secondary source of heat controlling said thermostat.

2. In a heating system, a primary source of heat comprising means for producing combustion, means for transferring the heat to a desired region, means controlling the combustion, an electric circuit controlling said combustion-controlling means, a thermostat in said region responsive to the transferred heat controlling said circuit, and a secondary source of heat influencing said thermostat and controlled by said thermostat.

3. In a heating system, a primary source of heat comprising means for producing combustion, means for transferring the heat to a desired region, means controlling the combustion, an electric circuit controlling said combustion-controlling means, a thermostat in said region responsive to the transferred heat controlling said circuit, and a secondary source of heat comprising an electric heater influencing said thermostat and controlled by said thermostat.

4. In a heating system, a primary source of heat comprising means for producing combustion, means controlling the combustion, an electric circuit controlling said combustion-controlling means, a thermostat responsive to the heat produced by said primary source controlling said circuit, and a secondary source of heat comprising an incandescent electric heater controlling said thermostat.

5. In a heating system, a primary source of heat comprising means for producing combustion, means for transferring the heat to a desired region, means controlling the combustion, an electric circuit controlling said combustion-controlling means, a thermostat in said region responsive to the transferred heat controlling said circuit, and a secondary source of heat comprising an electric heater controlled by said thermostat.

6. In a heating system, a primary source of heat comprising means for producing combustion, means for transferring the heat to a desired region, means controlling the combustion, an electric circuit controlling said combustion-controlling means, a thermostat in said region responsive to the transferred heat controlling said circuit, and an incandescent secondary source of heat controlling said thermostat.

7. In a heating system, a primary source of heat comprising means for producing combustion, means controlling the combustion, an electric circuit controlling said combustion-controlling means, a thermostat responsive to the heat produced by said primary source controlling said circuit, and a secondary source of heat comprising an incandescent electric heater controlled by said thermostat and influencing said thermostat.

8. In a heating system, a primary source of heat comprising means for producing combustion, means controlling the combustion, an electric circuit controlling said combustion-controlling means, a thermostat responsive to the heat produced by said source and opening said circuit to decrease combustion, and an electric heater influencing said thermostat and controlled by said circuit.

9. In a heating system, a primary source of heat comprising means for producing combustion, means controlling the combustion, an electric circuit controlling said combustion-controlling means, a thermostat responsive to the heat produced by said source and opening said circuit to decrease combustion, and an electric heater influencing said thermostat and rendered operative upon closure of said circuit.

10. In a heating system, a primary source of heat comprising means for producing combustion, means controlling the combustion, an electric circuit controlling said combustion-controlling means, a thermostat responsive to the heat produced by said source and opening said circuit to decrease combustion, and an electric heater influencing said thermostat and rendered operative upon closure of said circuit by said thermostat.

11. The combination with a thermostat, of a circuit controlled thereby, a primary source of heat influencing said thermostat and controlled thereby, and a secondary source of heat influencing said thermostat and comprising an incandescent electric heater included in said circuit.

12. Thermostatic apparatus comprising a conducting base, a thermostat supported on said base and insulated therefrom, a contact co-acting with said thermostat and connected with said base, and an electric heater influencing said thermostat at times and having one terminal connected with said base.

13. Thermostatic apparatus comprising a conducting base, a thermostat supported on said base and insulated therefrom, a contact co-acting with said thermostat and connected with said base, and an electric heater influencing said thermostat at times and having one terminal connected with said base and its other terminal insulated from said thermostat.

14. In a system for controlling the rate of combustion, means for effecting combustion, means controlling the delivery of a combustion producing agent, means responsive to the temperature produced by the combustion effecting means for governing said controlling means, and means influencing said responsive means to change the time of control.

15. A system for controlling combustion comprising means for producing combustion in one region, means controlling the rate of combustion, means in another region responsive to the temperature produced by the combustion producing means for controlling said combustion controlling means, and means influencing said responsive means to change the time of control.

16. A system for controlling combustion comprising means for producing combustion, electro-mechanical means controlling the rate of combustion, and means responsive to the temperature produced by the combustion producing means for controlling said electro-mechanical means, and means influencing said responsive means to change the time of control.

17. A system for controlling combustion comprising means for producing combustion, electro-mechanical means including a rotatable member for controlling the rate of combustion, a thermostat responsive to the temperature produced by the combustion producing means for controlling said rotatable member, and means influencing said responsive means to change the time of control.

18. In a system for controlling the rate of combustion, means for effecting combustion, means controlling the delivery of a combustion producing agent, means responsive to the temperature produced by the combustion effecting means for controlling said controlling means, and means influencing said responsive means to cause successive interruptions in the delivery of the combustion producing agent to prevent a temperature change substantially exceeding a predetermined temperature.

19. In a system for controlling the rate of combustion, means for effecting combustion, means controlling the delivery of a combustion producing agent, means responsive to the temperature produced by the combustion effecting means for controlling said controlling means, and means influencing said responsive means to effect progressively shorter and shorter periods of delivery of said combustion producing agent to prevent a temperature change substantially exceeding a predetermined temperature.

20. In a heating system, a source of heat, means for transferring the heat to a desired region, means in said region responsive to temperature change for controlling the intensity of said source of heat, and means influencing said last mentioned means to change the time of control.

In testimony whereof I have hereunto affixed my signature this 20 day of February, 1924.

WILLIAM L. SHAFER.